United States Patent
Sikri et al.

(10) Patent No.: US 8,804,876 B2
(45) Date of Patent: Aug. 12, 2014

(54) ENHANCED MODULATION DETECTION

(75) Inventors: Divaydeep Sikri, Woking Surrey (GB); Nico De Laurentiis, Farnborough Hampshire (GB); Hassan Rafique, Slough (GB); Lukasz Bednarz, Hampton Hill (GB); Philip Children, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 1111 days.

(21) Appl. No.: 12/390,337

(22) Filed: Feb. 20, 2009

(65) Prior Publication Data

US 2010/0215128 A1   Aug. 26, 2010

(51) Int. Cl.
    *H03D 3/22*   (2006.01)

(52) U.S. Cl.
    USPC .......................................... 375/329

(58) Field of Classification Search
    USPC ......... 375/227, 260, 316, 319, 322, 323, 324, 375/329, 332, 340, 346, 349; 455/69, 134, 455/135, 436, 513, 522, 566
    See application file for complete search history.

(56) References Cited

U.S. PATENT DOCUMENTS

| | | | |
|---|---|---|---|
| 6,463,107 B1 | 10/2002 | Lindoff et al. | |
| 8,175,186 B1 * | 5/2012 | Wiss et al. | 375/295 |
| 2004/0252790 A1 * | 12/2004 | Yang et al. | 375/340 |
| 2005/0238086 A1 * | 10/2005 | Kokubo | 375/148 |
| 2006/0215789 A1 * | 9/2006 | Ghosh et al. | 375/329 |
| 2007/0047587 A1 | 3/2007 | Kuo et al. | |
| 2007/0155334 A1 * | 7/2007 | Chang et al. | 455/67.13 |
| 2008/0049821 A1 * | 2/2008 | Murao | 375/227 |

FOREIGN PATENT DOCUMENTS

| | | |
|---|---|---|
| EP | 1489804 A2 | 12/2004 |
| WO | WO0062498 A1 | 10/2000 |
| WO | WO2006102572 A1 | 9/2006 |

OTHER PUBLICATIONS

Nternational Search Report & Written Opinion—PCT/US2010/024738, International Search Authority—European Patent Office—May 12, 2010.

* cited by examiner

*Primary Examiner* — Sam K Ahn
*Assistant Examiner* — Syed Haider
(74) *Attorney, Agent, or Firm* — Larry Moskowitz

(57) ABSTRACT

An apparatus is provided for demodulating a block, the block including a plurality of bursts. The apparatus comprises a demodulator configured to demodulate the plurality of bursts and a modulation detector configured to detect a modulation scheme for a current burst in the plurality of bursts and to determine whether there is a high probability that the detected modulation scheme is correct. The modulation detector instructs the demodulator to demodulate each burst subsequent to the current burst in the plurality of bursts based on the detected modulation scheme when the modulation detector determines a high probability that the modulation scheme is correct.

31 Claims, 10 Drawing Sheets

ENHANCED MODULATION DETECTION

BACKGROUND

1. Field

The subject technology generally relates to wireless communication, and more specifically to a method and apparatus for enhanced modulation detection.

2. Background

Wireless communication systems are widely deployed to provide various communication services such as voice and data communication. These wireless systems may be multiple-access systems capable of communicating with multiple wireless devices (e.g., cellular phones) to provide communication services to multiple users. Wireless communication systems may employ various wireless communication technologies including Code Division Multiple Access (CDMA), Time Division Multiple Access (TDMA), Frequency Divisional Multiple Access (FDMA), Orthogonal FDMA (OFDMA), and others. A widely employed example of TDMA is Global System for Mobile communication (GSM).

A base station in a wireless communication system may transmit data to a mobile station using different modulation schemes, for example, depending on the quality of a radio link between the base station and the mobile station. An example of a communication technology supporting multiple modulation schemes is Enhanced Data rates for GSM Evolution (EDGE), which provides enhanced data rates for GSM networks. An EDGE-enabled base station is capable of transmitting data to a mobile station using either 8-Phase Shift Keying (8-PSK) modulation or Gaussian Minimum Shift Keying (GMSK) modulation. 8-PSK modulation is capable of providing much higher data rates than GMSK modulation. However, GMSK modulation is able to operate in lower Signal-to-Noise (SNR) environments, for example, when the mobile station is located far from the base station.

A base station supporting multiple modulation schemes may use adaptive modulation to determine which modulation scheme to use, for example, based on feedback from the mobile station indicating the radio link quality between the base station and the mobile station. The base station may also adaptively change the coding rate for data transmission based on the feedback from the mobile station.

To properly decode data from a base station, the mobile station needs to demodulate the corresponding received signal based on the modulation scheme used at the base station. However, a mobile station may not know the modulation scheme in advance, for example, when the base station changes the modulation scheme quickly. In this case, the mobile station may detect the modulation scheme from the received signal and demodulate the received signal based on the detected modulation scheme. However, an incorrect detection of the modulation scheme causes the mobile station to demodulate the received signal based on the wrong modulation scheme, leading to failure in the data decoding. For example, the base station may transmit data in blocks, where each block includes a plurality of bursts. In this example, if the mobile station incorrectly detects the modulation scheme for one of the bursts in the block, then the mobile station will likely be unable to properly decode the block.

Accordingly, there is a need for systems and method for enhanced modulation detection.

SUMMARY

In one aspect of the disclosure, a method for demodulating a block including a plurality of bursts is provided. The method comprises detecting a modulation scheme for a current burst in the plurality of bursts and determining whether there is a high probability that the detected modulation scheme is correct. The method further comprises demodulating each burst subsequent to the current burst in the plurality of bursts based on the detected modulation scheme when there is a high probability that the detected modulation scheme is correct.

In a further aspect of the disclosure, an apparatus for demodulating a block including a plurality of bursts is provided. The apparatus comprises a demodulator configured to demodulate the plurality of bursts and a modulation detector configured to detect a modulation scheme for a current burst in the plurality of bursts. The modulation detector is further configured to determine whether there is a high probability that the detected modulation scheme is correct and to instruct the demodulator to demodulate each burst subsequent to the current burst in the plurality of bursts based on the detected modulation scheme when the modulation detector determines a high probability that the detected modulation scheme is correct.

In yet a further aspect of the disclosure, an apparatus for demodulating a block including a plurality of bursts is provided. The apparatus comprises means for detecting a modulation scheme for a current burst in the plurality of bursts, means for demodulating the plurality of bursts and means for determining whether there is a high probability that the detected modulation scheme is correct. The means for demodulating demodulates each burst subsequent to the current burst in the plurality of bursts based on the detected modulation scheme when the means for determining determines a high probability that the detected modulation scheme is correct.

In yet a further aspect of the disclosure, a machine-readable medium is provided, the machine-readable medium having instructions stored thereon, the instructions being executable by one or more processors. The instructions include instructions for detecting a modulation scheme for a current burst in the plurality of bursts of a block and instructions for determining whether there is a high probability that the detected modulation scheme is correct. The instructions further include instructions for demodulating each burst subsequent to the current burst in the plurality of bursts based on the detected modulation scheme when there is a high probability that the detected modulation scheme is correct.

In yet a further aspect of the disclosure, an apparatus for demodulating a block including a plurality of burst is provided. The apparatus comprises at least one processor configured to detect a modulation scheme for a current burst in the plurality of bursts, to instruct a demodulator to demodulate the current burst based on the detected modulation scheme and to determine whether there is a high probability that the detected modulation scheme is correct. The at least one processor is further configured to instruct the demodulator to demodulate each burst subsequent to the current burst in the plurality of bursts based on the detected modulation scheme when the at least one processor determines a high probability that the detected modulation scheme is correct.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

Figure 1:
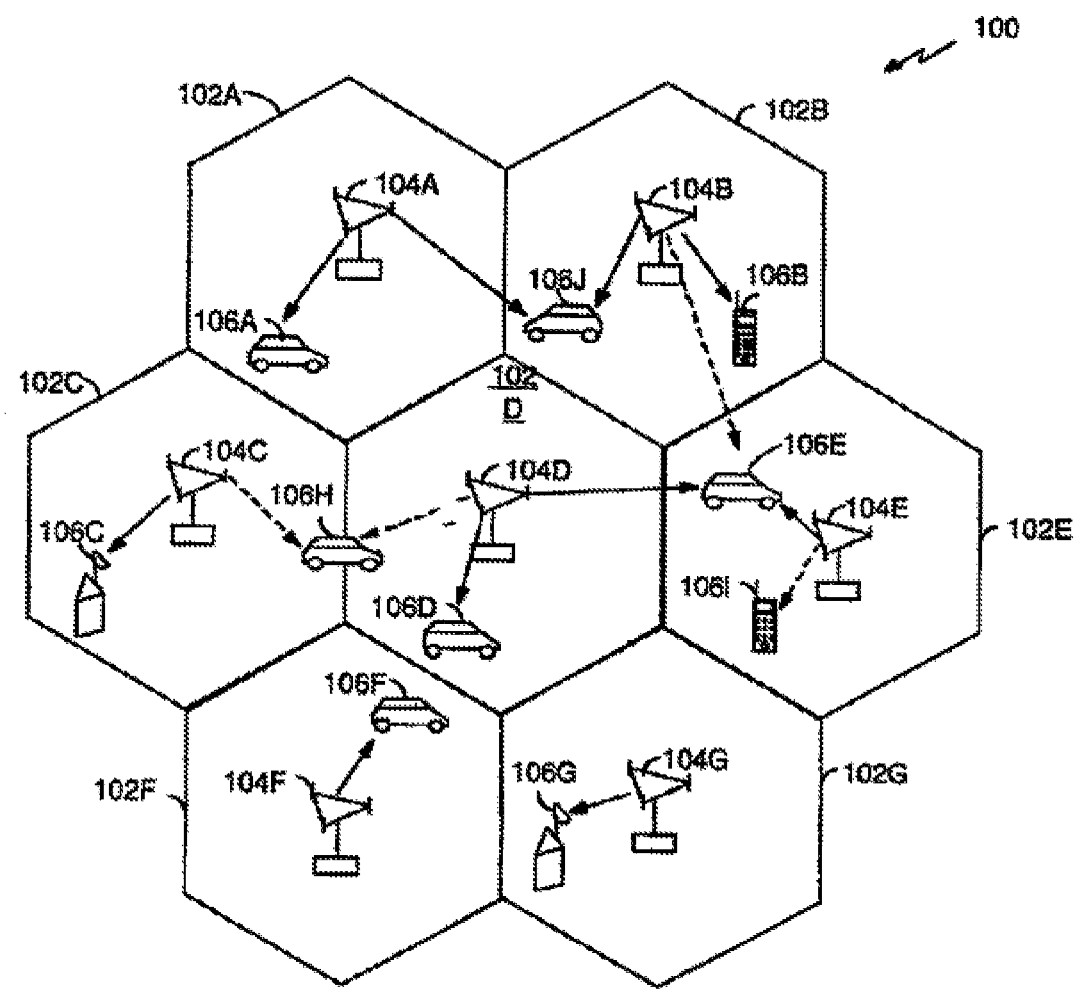
FIG. 1 is a diagram of a wireless communication system.

FIG. 1 is a diagram of a wireless communication system, according to certain aspects of the present disclosure. Communication system 100 provides communication for a number of cells 102A-102G (referred to as cells 102), each of which is serviced by a corresponding base station 104A-104G (referred to as base stations 104). Of course, any number of cells 102 and base stations 104 may be included in the communication system 100. In the exemplary communication system 100, some of the base stations 104 have multiple receive antennas and others have only one receive antenna. Similarly, some of the base stations 104 have multiple transmit antennas and others have a single transmit antenna.

Mobile stations 106A-106H (referred to as mobile stations 106) may refer to, for example, cellular phones, PDAs or the like, and may also be called mobile devices, user equipment (UE), wireless communication devices, terminals, stations, mobile equipment (ME) or some other terminology. As shown in FIG. 1, various mobile stations 106 may be dispersed throughout the communication system 100, and each mobile station 106 communicates with at least one base station 104 on a downlink and uplink at any given moment.

Different technologies may be used for various communication systems such as (1) a Code Division Multiple Access CDMA system that transmits data for different users using different orthogonal code sequences, (2) a Frequency Division Multiple Access FDMA system that transmits data for different users on different frequency subbands, (3) a Time Division Multiple Access TDMA system that transmits data for different users in different time slots, (4) a Spatial Division Multiple Access (SDMA) system that transmits data for different users on different spatial channels, (5) an Orthogonal Frequency Division Multiples Access (OFDMA) system that transmits data for different users on different frequency subbands, and so on. A widely deployed example of TDMA is the Global System for Mobile communication (GSM).

An example of a technology that can be used for communication systems is Enhanced Data rates for GSM Evolution (EDGE), which provides enhanced data rates for GSM networks. EDGE currently supports two different modulation schemes: 8-Phase Shift Keying (8-PSK) and Gaussian Minimum Shift Keying (GMSK). 8-PSK modulation modulates three bits per symbol while GMSK modulation modulates one bit per symbol. Thus, 8-PSK modulation is capable of providing much higher data rates than GMSK modulation. However, GMSK modulation is able to operate in lower Signal-to-Noise Ratio (SNR) environments than 8-PSK modulation.

EDGE also supports five different coding schemes for 8-PSK and four different coding schemes for GMSK. The different coding schemes provide different amounts of error-correction coding for the data to be transmitted. For example, a higher amount of error-correction coding provides more robustness at the cost of lower data throughput.

Thus, EDGE supports nine different combinations of modulation and coding schemes resulting in nine different Modulation Coding Schemes (MCSs). The different MCSs provide optimal data throughput under different radio environments.

EDGE also supports adaptive modulation and coding, in which a base station 104 adaptively selects one of the MCSs for data transmission to a mobile station 106 based on an indication of radio link quality between the base station 104 and the mobile station 106. The indication may include, for example, an error bit probability of the received data at the mobile station 106, which is estimated by the mobile station 104 and transmitted to the base station 104 on an uplink. Adaptive modulation and coding enables the base station 104 to adaptively change the MCS to provide optimal data transmission as the radio link quality changes, for example, due to movement of the mobile station 106.

Figure 2:
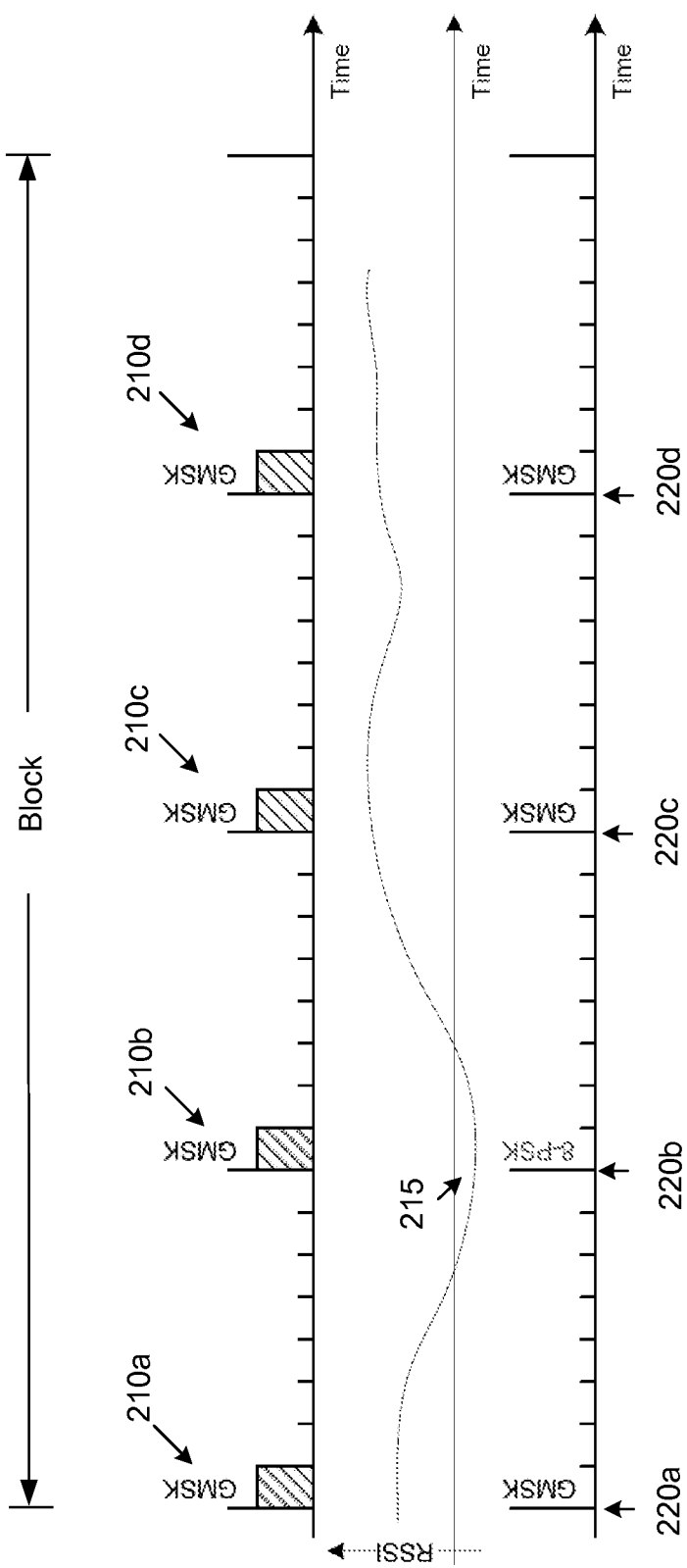
FIG. 2 are plots illustrating the timing of bursts in a block according to an aspect of the disclosure.

In a EDGE-enabled system, the base station 104 may transmit data to the mobile station 106 in blocks. For each block, the base station 104 may encode, interleave and modulate the data in the block based on the selected MCS and transmit the data in the block over four bursts. FIG. 2 illustrates an example of this, in which data in a block are transmitted over four bursts 210a to 210d in a time slot for one block. In this example, the data in the block are modulated using GMSK modulation, although it is to be understood that the data can also be modulated using 8-PSK modulation or other modulation scheme. Each of the four bursts 210a to 210d in a block are modulated using the same modulation scheme.

Each burst 210a to 210d includes data symbols carrying data and a training sequence of known symbols (known a priori by the mobile station 104). The training sequence in each burst 210a to 210d is phase rotated depending on the modulation scheme used to modulate the data in the burst. For EDGE, the known symbols in the training sequence are rotated by $\pi/2$ radians for GMSK modulation and rotated by $3\pi/8$ radians for 8-PSK modulation. As explained further below, the rotation of the training sequence in a burst allows the mobile station 106 to detect the modulation scheme used to modulate the data in the burst. A burst may include 124 data symbols and 26 known symbols in the training sequence.

Figure 3:
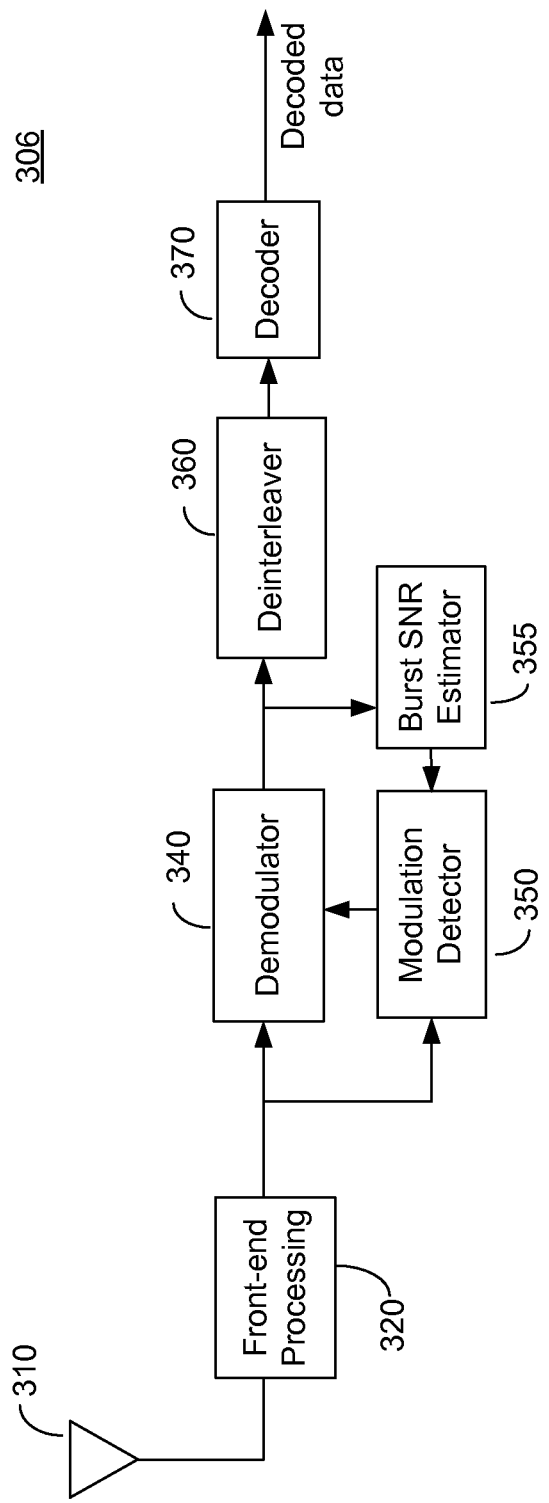
FIG. 3 is a diagram of a mobile station comprising a modulation detector according to an aspect of the disclosure.

FIG. 3 is a diagram of a mobile station 306 according to an aspect of the present disclosure. The mobile station 306 includes an antenna 310, a front-end processing unit 320, a demodulator 340, a modulation detector 350, a deinterleaver 360, and a decoder 370. To support EDGE, the demodulator 340 is capable of performing both GMSK modulation and 8-PSK modulation. The demodulator 340 may be implemented, for example, by a GMSK demodulator, an 8-PSK demodulator and a switch directing a received signal to either the GMSK demodulator or the 8-PSK demodulator.

In operation, the antenna 310 receives a signal from the base station 104, and the front-end processing unit 320 processes the received signal into samples. Processes performed on the received signal by the front-end processing unit 320 may include amplification, down conversion, filtering and analog-to-digital conversion to convert the received signal to the digital domain. Additional processes performed on the received signal in the digital domain may include digital filtering and decimation.

The samples from the front-end processing unit 320 are inputted to the modulation detector 350, which detects the modulation schemed used to modulate the corresponding data. The modulation detector 350 then sends an instruction to the demodulator 340 to demodulate the samples based on the detected modulation scheme. For example, if the modulation detector 350 detects 8-PSK modulation, then the modulation detector 350 instructs the demodulator 340 to demodulate the samples based on 8-PSK modulation. By detecting the modulation scheme from the samples, the modulator detector 350 allows the demodulator 340 to apply the appropriate demodulation to the samples without the mobile station 306 having to know the modulation scheme in advance.

The output from the demodulator 340 is then deinterleaved by the deinterleaver 360 and decoded by the deocoder 370 into decoded data. Information on the coding scheme is included in the received bursts and may be detected using the demodulated bits.

Figure 4:
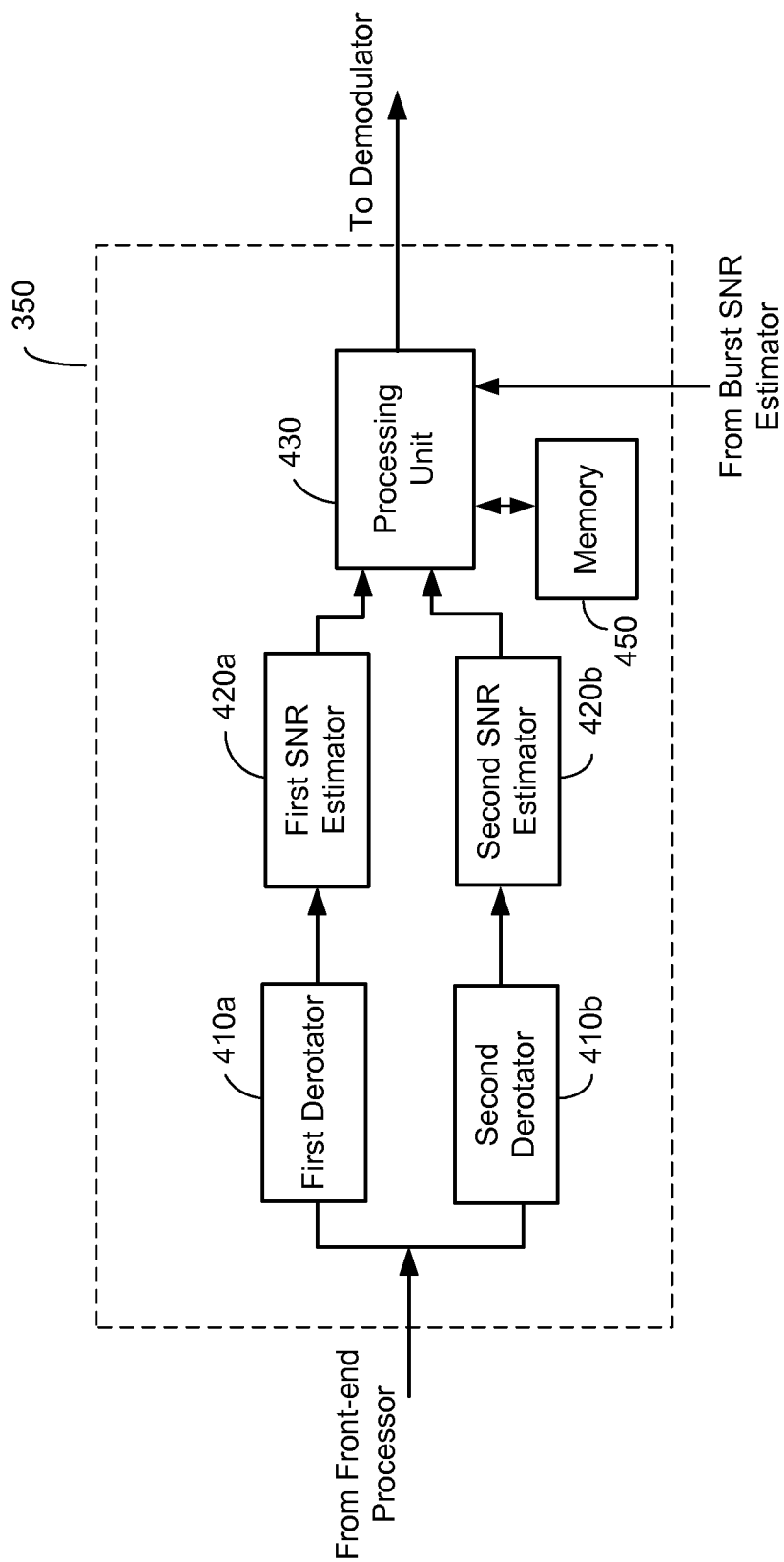
FIG. 4 is a diagram of a modulation detector according to an aspect of the disclosure.

FIG. 4 is a diagram of the modulation detector 350 according to one aspect of the disclosure. The modulation detector 350 comprises a first derotator 410a, a first SNR estimator 420a, a second derotator 410b, a second SNR estimator 420b, and a processing unit 430. In one aspect, the modulation detector 350 performs modulation detection on a burst-by-burst basis. In this aspect, the first derotator 410a derotates received samples over the training sequence of a received burst by $\pi/2$ radians. The second derotator 410b derotates received samples over the training sequence of the received burst by $3\pi/8$ radians. The first SNR estimator 420a estimates a first SNR based on the derotated received samples from the first derotator 410a, and the second SNR estimator estimates a second SNR based on the derotated received samples from the second derotator 410b.

The processing unit 430 receives the SNR estimates from the first and second SNR estimators 420a and 420b, compares the two SNR estimates and detects the modulation scheme corresponding to the greater of the two SNR estimates. If the first SNR estimate from the first SNR estimator 420a is greater than the second SNR estimate from the second SNR estimator 420b, then the processing unit 430 detects GMSK modulation for the corresponding burst. If the second SNR estimate from the second SNR estimator 420b is greater than the first SNR estimate from the first SNR estimator 420a, then the processing unit 430 detects 8-PSK modulation for the corresponding burst. The processing unit 430 then sends an instruction to the demodulator 340 to demodulate the corresponding burst based on the detected modulation scheme.

A method for estimating the SNR of derotated received samples over the training sequence of a burst will now be discussed, according to one aspect of the disclosure. The SNR may be defined as follows:

$$SNR = \frac{E_b}{N_0} \quad (1)$$

where $E_b$ is energy per bit and $N_0$ is noise power. The energy per bit is $E_b$ may be based on an estimation of the communication channel between the base station and the mobile station 306. The channel may be estimated by cross-correlating the derotated received samples over the training sequence with the known training sequence of symbols. Due to the auto-correlation properties of the training sequence, this provides a good channel estimation. Other techniques may also be used to estimate the channel. The channel may be estimated over V channel taps and represented as $h_1, \ldots, h_V$. The energy per bits $E_b$ may then be computed as follows:

$$E_b = \frac{\sum_{p=1}^{V} |h_p|^2}{\rho_m} \quad (2)$$

where $\rho_m$ is 1 for GMSK and 3 for 8-PSK. The number of channel taps V involves a tradeoff between accuracy in the channel estimation and complexity, with a higher number of channel taps providing higher accuracy at a cost of greater complexity. The number of channel taps V may be, for example, five.

The noise power $N_0$ can be computed based on the derotated received samples over the training sequence and reconstructed samples derived from the known symbols of the training sequence. The noise power may be computed as follows:

$$N_0 = \frac{1}{L-V+1} \sum_{n=V}^{L} \left( x_n - \sum_{p=1}^{V} h_p s_{n-p+1} \right)^2 \quad (3)$$

where $x_n$ represents the derotated received samples sampled at the symbol rate, $S_{n-p+1}$ represents the known symbols of the training sequence, and L=26 over the training sequence of the burst for a training sequence comprising 26 symbols. In equation (3), the known symbols of the training sequence are convolved with the channel estimation to reconstruct the samples over the training sequence. Each reconstructed sample is then subtracted from the corresponding derotated received sample and squared. The squared differences between the derotated received samples and the reconstructed samples are summed over the length n=V to n=L and divided by L−V+1 to obtain the noise power estimate The set of 26 known symbols for the training sequence can be represented as $[s_{TSC,1}, \ldots, s_{TSC,26}]$.

When the derotation of the derotated received samples corresponds to the correct modulation and noise is low, the reconstructed samples should be approximately equal to the derotated received samples, resulting in low noise power $N_0$ in equation (3). However, when the derotation does not correspond to the correct modulation, the derotated received samples are derotated by the wrong amount, resulting in large differences between the derotated received samples and the reconstructed samples over the training sequence. This is turn leads to high estimated noise power $N_0$ and low SNR. Thus, it can be assumed that the SNR estimate for the derotation corresponding to the correct modulation will be higher than the SNR estimate for the derotation corresponding to the wrong modulation, and therefore that the higher SNR estimate corresponds to the correct modulation. However, due to noise and the short duration of the training sequence of a burst, the SNR estimate corresponding to the wrong modulation can sometimes be higher, resulting in incorrect modulation detection.

To properly decode a received block, the mobile station 306 has to apply the appropriate demodulation to each of the four burst in the received block. If the mobile station 306 incorrectly detects the modulation scheme for one burst in a block, then the decoding of the block will likely fail. Incorrect modulation detection may occur, for example, due to high interference, signal fading and other causes. For example, the modulation detection becomes less reliable as the received signal strength becomes low, for example, when the mobile station 106 moves away from the base station 104.

FIG. 2 shows an example in which a received signal experiences deep fading 215 during the second burst 210b of a block. In this example, the deep fading 215 causes the modulation detector to incorrectly detect 8-PSK modulation 220b for the second burst 210b. Although the modulation schemes of the other three bursts 210a, 210c and 210d are correctly detected 220a, 220c and 220d in this example, the decoding of the block will likely fail because of the misdetection for the second burst 210b.

To reduce incorrect modulation detection, the mobile station 306 includes a burst SNR estimator 355, according to an aspect of the present disclosure. The burst SNR estimator 355 is configured to estimate the SNR for the detected modulation over a greater portion of the burst than the training sequence portion of the burst. Estimating the SNR for the detected modulation over a greater portion of the burst increases the accuracy of the noise power $N_0$ estimate by estimating the noise power for a longer duration, which averages out the noise. For example, the burst may include 124 data symbols in addition to the 26 known symbols of the training sequence for a total of 150 symbols over which to estimate the noise power. In one aspect, the burst SNR estimator 355 estimates the burst SNR for the detected modulation over the 150 symbols of the burst, which provides a much longer duration than the duration of the training sequence. This increases the accuracy of the burst SNR estimate for the detected modulation.

In one aspect, the burst SNR estimator 355 computes the noise power $N_0$ based on equation (3) over the data symbols of the burst and the known symbols of the training sequence. Since the data symbols are not known a priori by the mobile station 306, the burst SNR estimator 355 receives the demodulated bits for the burst from the demodulator 340 and estimates the data symbols, for example, by re-modulating the demodulated bits. The estimated data symbols and the known symbols of the training sequence may be represented by $[\hat{s}_1, \hat{s}_2, \ldots, \hat{s}_{62}, s_{TSC,1}, \ldots, s_{TSC,26}, \hat{s}_{63}, \ldots, \hat{s}_{124}]$, where the hat superscript denotes the estimates data symbols. In this aspect, the burst SNR estimator 355 computes the reconstructed samples for the burst by convolving the channel estimation with the estimated data symbols and the known symbols of the training sequence in equation (3). The burst SNR estimator 355 then computes the noise power by $N_0$ in equation (3) by subtracting the reconstructed samples over the data symbols from the received samples over the data symbols and subtracting the reconstructed samples over the training sequence from the derotated received samples over the training sequence. In this aspect, $L=150$ since the received samples span 150 symbols. After the noise power is computed, the burst estimator 355 estimates the burst SNR for the detected modulation based on equations (1) and (2). The burst SNR estimate is then inputted to the modulation detection 350 to determine whether there is a high probability that the detected modulation is correct, which is discussed in further detail below.

A process for reducing incorrect modulation detection will now be described according to one aspect of the present disclosure. The process may be performed by the modulation detector 350 and burst SNR estimator 355 in FIG. 3. In this aspect, after the modulation detector 350 detects the modulation scheme for a burst, the burst SNR estimator 355 estimates the burst SNR for the detected modulation scheme. The modulation detector 350 then determines whether there is a high probability that the detected modulation is correct based on the burst SNR estimate. If the modulation detector 350 determines a high probability that the detected modulation is correct, then the modulation detector 350 instructs the demodulator 340 to use the detected modulation scheme to demodulate the remaining bursts in the same block. For example, if the modulation detector 350 detects GMSK modulation for the second burst in a block and determines a high probability that the detected modulation is correct, then the modulation detector 350 instructs the demodulator 340 to use GSMK modulation to demodulate the remaining third and fourth bursts in the block for the example of four bursts per block.

In one aspect, the processing unit 430 in the modulation detector 350 can determine a high probability that the detected modulation is correct based on whether the burst SNR estimate for the detected modulation scheme is greater than a threshold. If the burst SNR estimate is above the threshold, then the processing unit 430 determines a high probability that the detected modulation is correct and instructs the demodulator 340 to use the detected modulation for the remaining bursts in same block. In this case, the modulation detector 340 does not need to perform modulation detection for the remaining bursts in the block.

Figure 5:
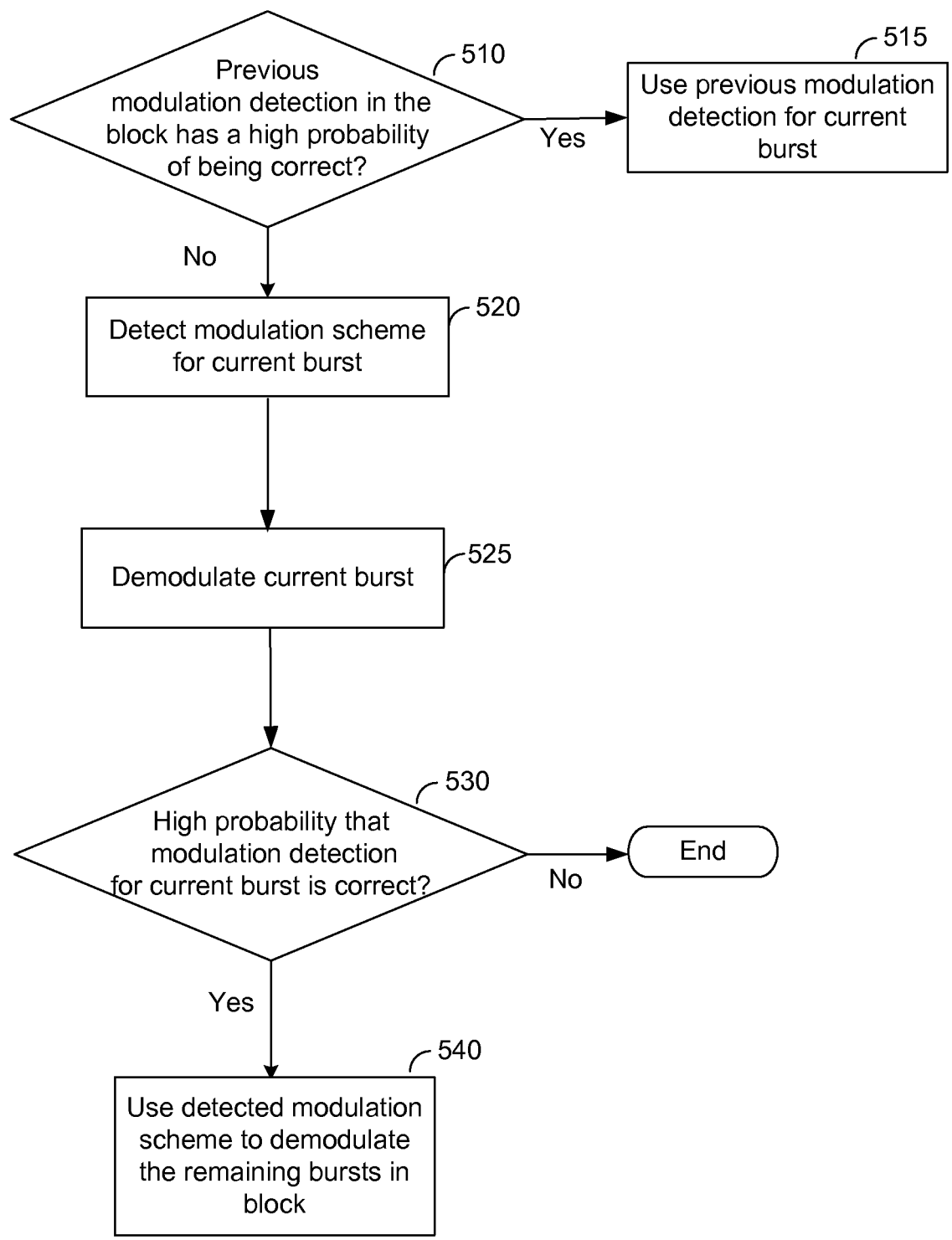
FIG. 5 is a flowchart illustrating a process for modulation detection according to an aspect of the disclosure.

FIG. 5 is a flowchart illustrating a process for determining a modulation scheme for a current burst in a block according to an aspect of the present disclosure. The process in FIG. 5 may be performed by the modulation detector 350 and the burst SNR estimator 355.

In step 510, if a previous modulation detection in the block has a high probability of being correct, then the process uses the previous modulation detection to demodulate the current burst in step 515. For example, if the process previously determined a high probability that a detected modulation scheme for a previous burst (e.g., first burst) in the block was correct, then the process uses this detected modulation scheme to demodulate the current burst (e.g., second burst) in the block. Otherwise, the process advances to step 520.

In step 520, the processing detects a modulation scheme for the current burst. For example, the processing may compare the SNR estimates for 8-PSK modulation and GMSK modulation, and detect the modulation scheme corresponding to the highest SNR estimate.

In step 525, the process demodulates the current burst based on the detected modulation scheme.

In step 530, the process then determines whether there is a high probability that the detected modulation scheme for the current burst is correct. For example, the process may determine whether the burst SNR estimate is above a threshold. In this example, if the burst SNR estimate is above the threshold, then the process determines a high probability that the detected modulation scheme for the current burst is correct. Otherwise, the process determines that the probability is not high. As discussed above, the burst SNR estimate for the detected modulation is estimated over a greater portion of the burst than the training portion of the burst to provide a more accurate SNR estimate.

If the process determines a high probability that the detected modulation scheme for the current burst is correct, then the process uses the detected modulation scheme to demodulate the remaining bursts in the block in step 540. If the process does not determine a high probability that the detected modulation is correct, then the process ends for the current burst. In this case, the process may repeat steps 525 through 540 for a next burst in the block.

Figure 6:
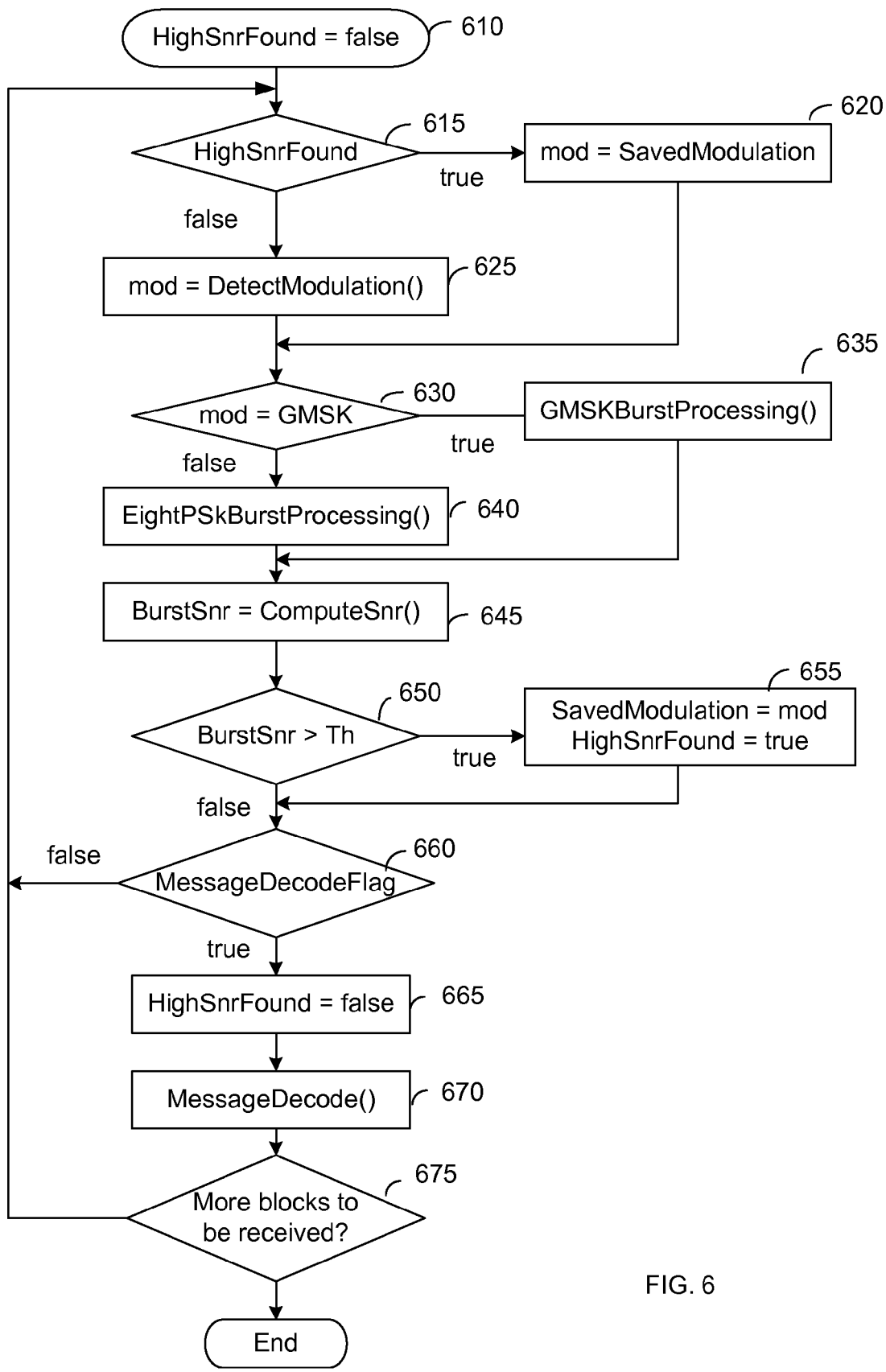
FIG. 6 is a flowchart illustrating a process for modulation detection according to another aspect of the disclosure.

FIG. 6 is a flowchart illustrating a process for modulation detection according to an aspect of the present disclosure. The process in FIG. 6 may be performed by the modulation detector 350 and the burst SNR estimator.

In step 610, the process initially sets a HighSnrFound indicator to false. As explained below, the process sets the HighSNRFound indicator to true when a burst SNR estimate (BurstSnr) for a burst is above a threshold (Th) in step 650.

In step 615, the process determines whether the HighSnr-Found indicator is true or false. As explained below, the HighSnrFound indicator is initially set to false at the beginning of a block in step 610 or step 665. If the HighSnrFound indicator is false, then the process advances to step 625. In step 625, the process performs a DetectModulation ( ) operation to detect a modulation scheme (mod) for a current received burst. For example, the DetectModulation( ) operation may detect the modulation scheme (mod) by comparing an SNR estimate for 8-PSK modulation with an SNR estimate for GMSK modulation, and detecting the modulation scheme corresponding to the highest SNR estimate. If the HighSnr-Found indicator is true in step 615, then the process advances to step 620. In step 620, the process uses a saved modulation scheme (mod) indicated by a SavedModulation indicator to process the current received burst, as explained further below.

In step 630, the process determines whether the detected or saved modulation scheme (mod) is GMSK modulation. If the modulation scheme (mod) is GMSK modulation, then the process performs a GMSKBurstProcessing( ) operation for the current burst in step 635. For example, the process may send an instruction to the demodulator 340 to demodulate the current burst based on GMSK modulation. If the modulation scheme (mod) is 8-PSK modulation, then the process performs an EightPSKBurstProcessing( ) operation for the current burst in step 640. For example, the process may send an instruction to the demodulator 340 to demodulate the current burst based on 8-PSK modulation.

In step 645, the process performs a ComputeSnr( ) operation to determine a burst SNR estimate (BurstSnr) for the current burst.

In step 650, the process determines whether the burst SNR estimate (BurstSnr) is above a threshold (Th). If the burst SNR estimate (BurstSnr) is above the threshold (Th), then the process sets the SavedModulation indicator to the modulation scheme (mod) used for the current burst and sets the HighSnrFound indicator to true in step 655.

In step 660, the process determines whether a MessageDecodeFlag is true or false. The MessageDecodeFlag is true when all of the bursts in a block have been received. For example, the MessageDecodeFlag is true when the current burst is the last burst in the block and false when the current burst is not the last burst in the block. If the MessageDecodeFlag is true, then the block can be decoded and the process advances to step 665. If the MessageDecodeFlag is false, then the process repeats 615 through 655 for each of the remaining bursts in the block.

In step 665, the process sets the HighSnrFound indicator to false for a next block. If the HighSnrFound indicator is true, then the process unit 430 resets the HighSnrFound to false for the next block. In step 670, the process performs a MessageDecode( ) operation to decode the block corresponding to the current burst. For example, the process may instruct the decoder 370 to decode the block. This operation is performed when the current burst is the last burst in the block, which occurs when all of the bursts in the block have been received.

In step 675, the process determines whether more blocks are to be received. This can be determined by upper-level protocols, which instruct the mobile station whether to receive more blocks. If no more blocks are to be received, then the process ends. If more blocks are to be received, then the process repeats steps 615 through 675 for the next block.

The indicators and values described above may be stored in memory internal to the processing unit 430 and/or external memory that is accessible by the processing unit 430. FIG. 4 shows an example of memory 450 communicatively coupled to the processing unit 430.

Figure 7:
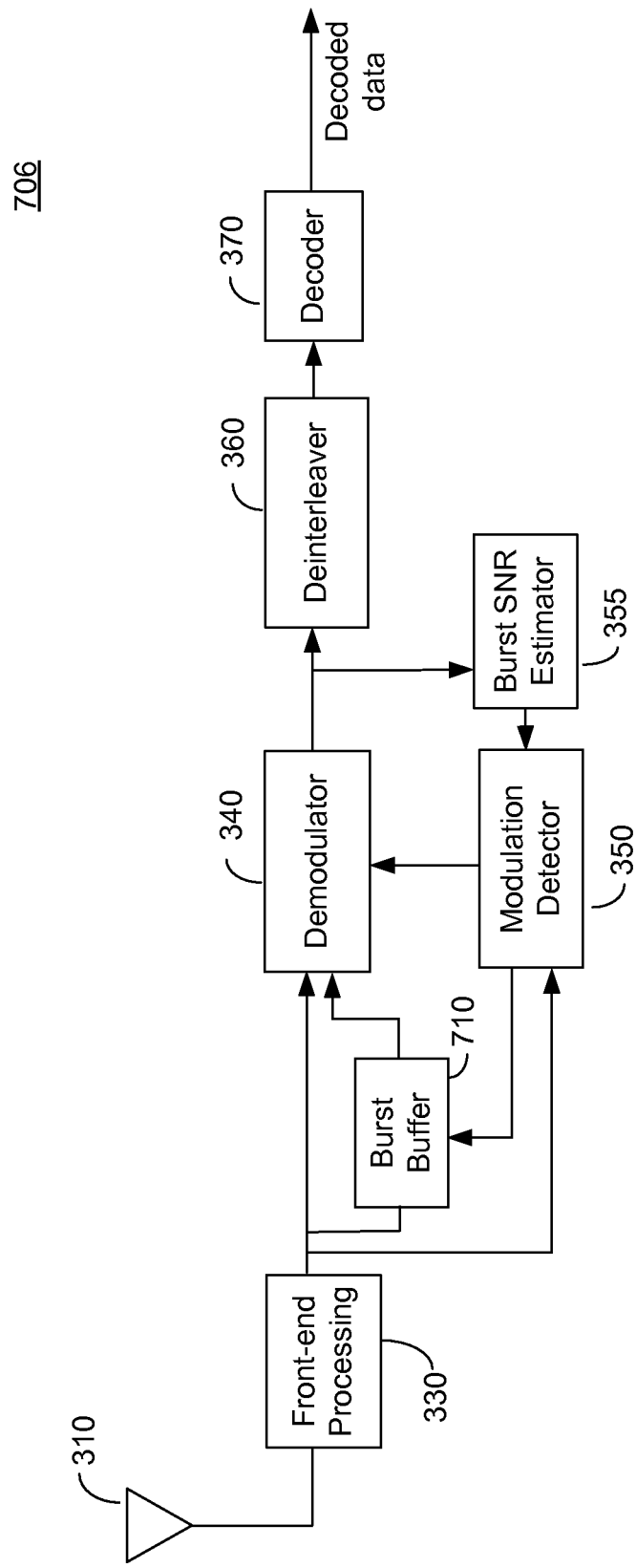
FIG. 7 is a diagram of a mobile station comprising a modulation detector and a burst buffer according to an aspect of the disclosure.

FIG. 7 is a diagram of a mobile station 706 according to an aspect of the present disclosure. The mobile station 706 is similar to the mobile station 306 in FIG. 3 with the addition of a burst buffer 710 between the front-end processing unit 320 and the demodulator 340. The burst buffer 710 is configured to temporarily store the samples of one or more bursts in a block from the front-end processing unit 320.

For each block, the burst buffer 710 may temporarily store the samples of each burst in a block as they are received by the mobile station 706. This allows the mobile station 706 to go back and demodulate a previously received burst using a modulation scheme detected for a current burst, as discussed below.

In one aspect, the modulation detector 350 detects a modulation scheme for a current burst in the block and determines whether there is a high probability that the modulation detection is correct. If the modulator detector 350 determines a high probability that the modulation detection is correct, then the modulator detector 350 uses the detected modulation scheme to demodulate all of the bursts in the block. The modulator detector 350 applies the detected modulation scheme to the remaining bursts in the block, the same as before The modulation detector 350 also applies the detected modulation scheme to the previous bursts in the block by instructing the burst buffer 710 to read out the previous bursts in the block to the demodulator 340 and instructing the demodulator 340 to demodulate the previous bursts based on the detected modulation scheme for the current burst. The current burst does not need to be demodulated again since it has already been demodulated based on the correct modulation scheme. After a block is processed, the bursts in the block may be erased and/or written over in the burst buffer 710 to make room for the bursts of the next block.

Figure 8:
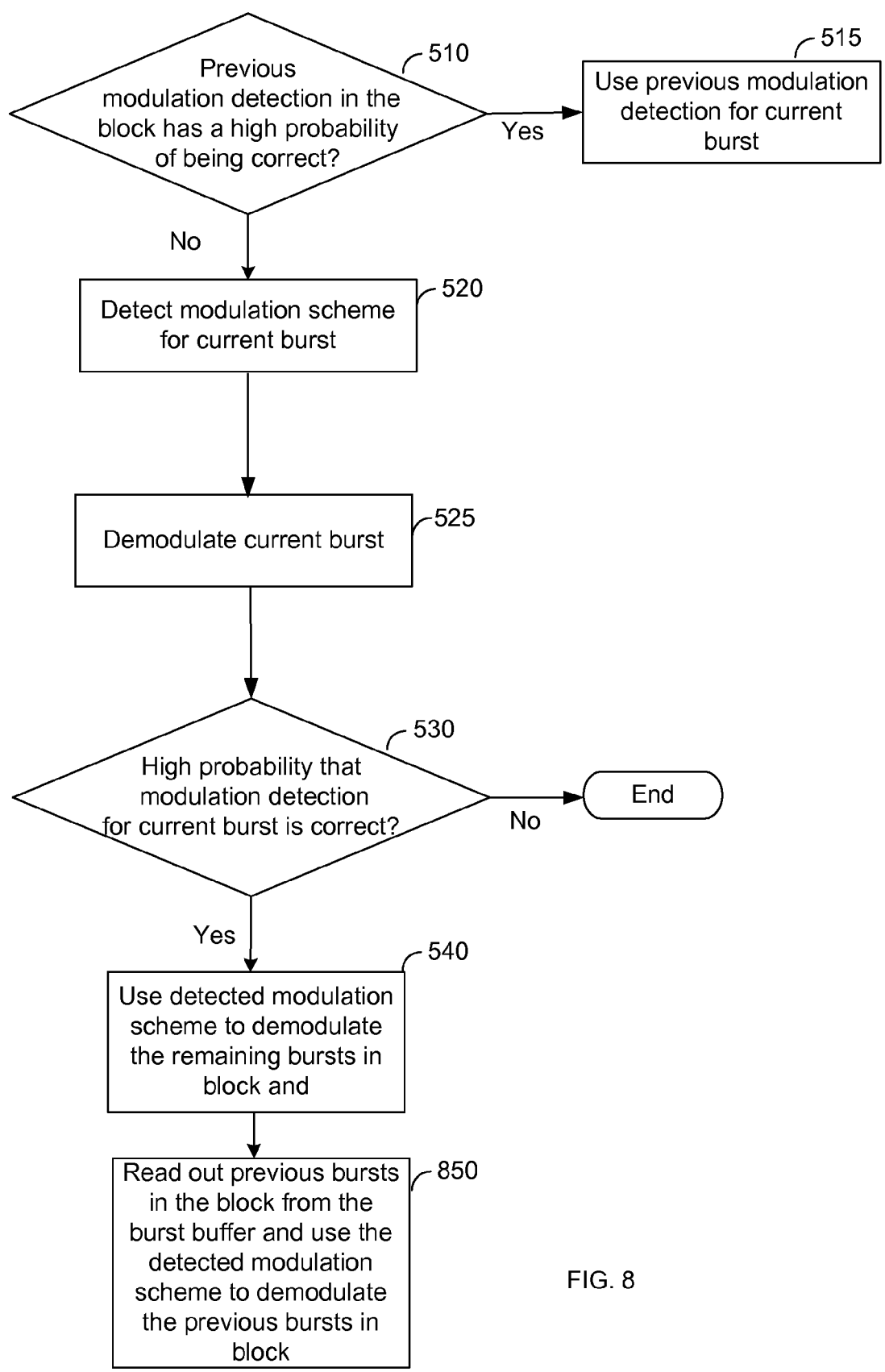
FIG. 8 is a flowchart illustrating a process for modulation detection according to yet another aspect of the disclosure.

FIG. 8 is a flowchart illustrating a process for determining a modulation scheme for a current burst in a block according to an aspect of the present disclosure. The process in FIG. 8 is similar to the process in FIG. 5 with the addition of step 850, which is performed when the process determines a high probability that the modulation detection for the current burst is correct in step 530. In step 850, the process reads out the previous bursts in the block from the burst buffer 710 and uses the detected modulation scheme to demodulate the previous bursts in the block.

In another aspect, the processing unit 430 may process each of the previous bursts in the block using the detected modulation scheme for the respective previous burst, and store the detected modulation scheme of each of the previous bursts in memory, e.g., the memory 450. When the processing unit 430 determines a high probability that the modulation detection for a current burst is correct, then the processing unit 430 goes back and compares the detected modulation scheme for each of the previous bursts in the block with the detected modulation scheme for the current burst in the block. Based on the comparisons, the processing unit 430 determines which of the previous bursts were demodulated based on a detected modulation scheme different from the detected modulation scheme for the current burst. The processing unit 430 then instructs the burst buffer 710 to read out the previous bursts from the burst buffer 710 having detected modulation schemes different from the detected modulation scheme for the current burst. The processing unit 430 instructs the demodulator 340 to demodulate these previous bursts based on the detected modulation scheme for the current burst. If these previous bursts have been previously demodulated by the demodulator 340, then the processing unit 430 instructs the decoder 370 to discard the previous demodulations of these previous bursts and to decode the block using the demodulations of these previous bursts based on the detected modulation scheme for the current burst.

Figure 9:
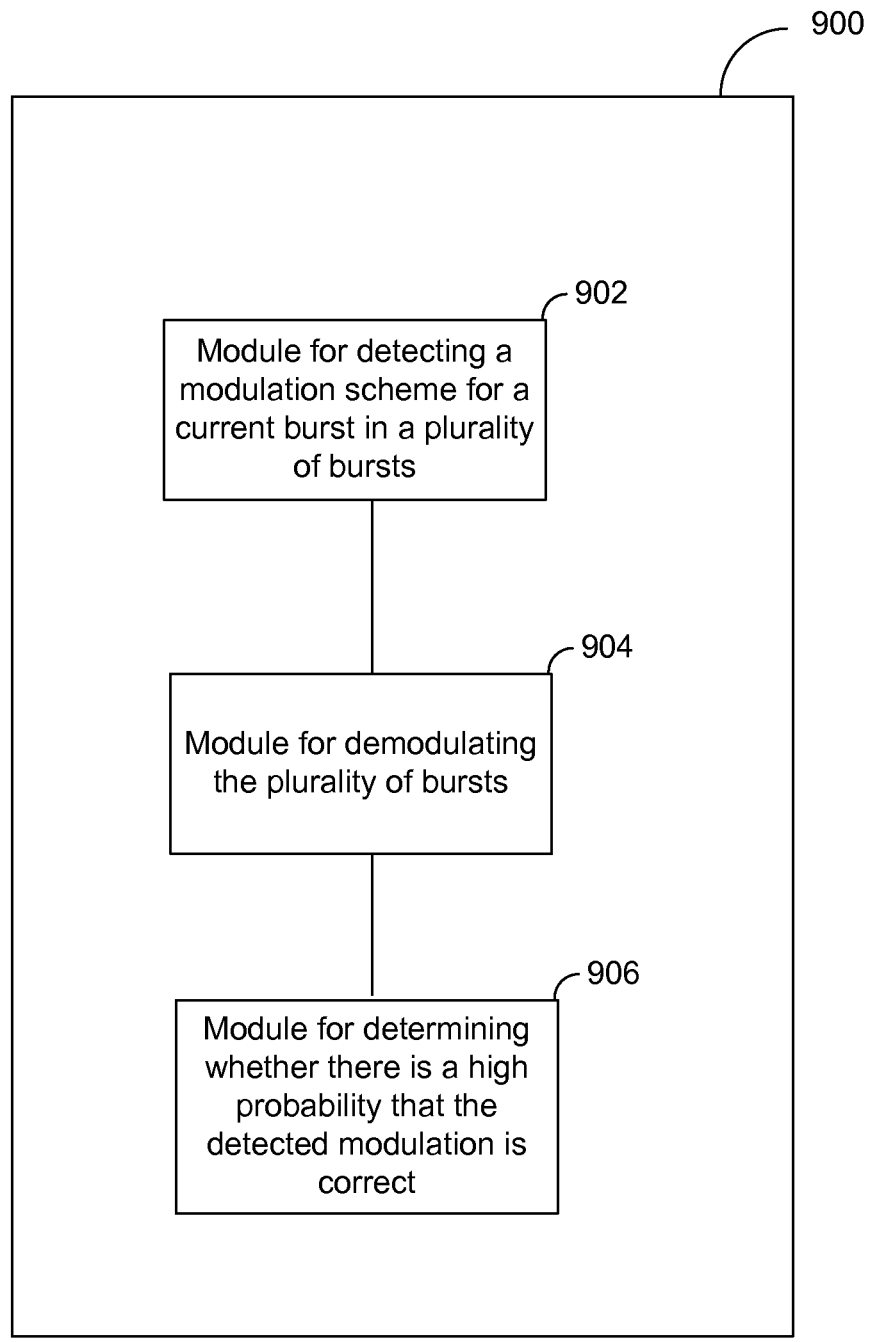
FIG. 9 is a conceptual block diagram illustrating an example of the functionality of a device for demodulating a block including a plurality of bursts.

FIG. 9 is a conceptual block diagram illustrating an example of the functionality of a device for demodulating a block including a plurality of bursts. Device 900 includes a module 902 for detecting a modulation scheme for a current burst in the plurality of bursts, a module 904 for demodulating the plurality of bursts, and a module 906 for determining whether there is a high probability that the detected modulation scheme is correct. Module 904 demodulates each burst subsequent to the current burst in the plurality of bursts based on the detected modulation scheme when module 906 determines a high probability that the detected modulation scheme is correct.

Figure 10:
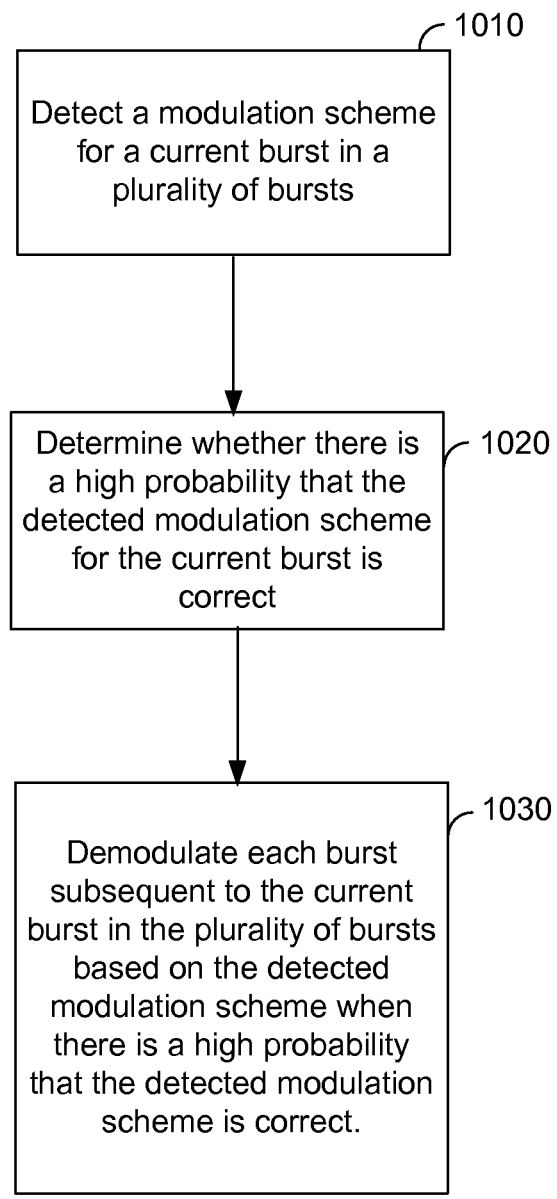
FIG. 10 is a flowchart illustrating a method for demodulating a block including a plurality of bursts according to an aspect of the disclosure.

FIG. 10 is a flowchart illustrating a process for demodulating a block including a plurality of bursts according to an aspect of the disclosure. In step 1010, the process detects a modulation scheme for a current burst in the plurality of bursts. In step 1020, the method determines whether there is a high probability that the detected modulation scheme for the current burst is correct. In step 1030, the method demodulates each burst subsequent to the current burst in the plurality of bursts based on the detected modulation scheme when there is a high probability that the detected modulation scheme is correct.

The methodologies described herein may be implemented by various means depending upon the application. For example, these methodologies may be implemented in hardware, firmware, software or a combination thereof For a hardware implementation, the processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. For example, the operations of the modulation detector 350 and burst SNR estimator 355 may be implemented using one or more processors.

For a firmware and/or software implementation, the methodologies may be implemented with modules (e.g., procedures, functions, and so on) that perform the functions described herein. Any machine readable medium tangibly embodying instructions may be used in implementing the methodologies described herein. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

The memories described in the disclosure may comprise machine readable media. Machine readable media may include storage integrated into a processor, such as might be the case with an ASIC, and/or storage external to a processor. By way of illustration, and not limitation, readable media may include one or more of volatile memory, nonvolatile memory, a Random Access Memory (RAM), a flash memory, a Read Only Memory (ROM), a Programmable Read-Only Memory (PROM), an Erasable PROM (EPROM), a register, a hard disk, a removable disk, a CD-ROM, a DVD, or any other suitable storage device. In addition, readable media may include a transmission line or a carrier wave that encodes a data signal. A readable medium may be a machine readable media encoded or stored with a computer program or instructions. The computer program or instructions may be executable by a transmitter or receiver device or by a processor of a transmitter or receiver device.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

Examples of particular communications protocols and formats have been given to illustrate the subject technology. However, the subject technology is not limited to these examples and applies to other communications protocols and formats.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for demodulating a block at a receiver, the block including a plurality of bursts, the method comprising:
    detecting a modulation scheme for a current burst in the plurality of bursts, wherein a burst comprises a data symbol portion and a training sequence portion;
    determining whether there is a high probability that the detected modulation scheme is correct, wherein the determining whether there is a high probability that the detected modulation scheme is correct comprises:
        demodulating the current burst based on the detected modulation scheme;
        estimating a burst signal-to-noise ratio (SNR), wherein estimating the burst SNR comprises:
            estimating data symbols of the current burst based on the demodulated current burst;
            computing first reconstructed samples by convolving the data symbol estimates with channel estimates;
            computing second reconstructed samples by convolving the training sequence portion with the channel estimates;
            estimating a noise power by subtracting the first reconstructed samples from the data symbol portion of the current burst and subtracting the second reconstructed samples from the training sequence portion of the demodulated current burst; and
            estimating the burst SNR based on the noise power estimate; and
        determining a high probability that the detected modulation scheme is correct if the burst SNR estimate is above a threshold; and
    demodulating each burst subsequent to the current burst in the plurality of bursts based on the detected modulation scheme when there is a high probability that the detected modulation scheme is correct.

2. The method of claim 1, wherein detecting the modulation scheme for the current burst comprises:
    estimating a first SNR for a first modulation scheme;
    estimating a second SNR for a second modulation scheme; and
    selecting one of the first and second modulation schemes based on the first and second SNR estimates.

3. The method of claim 2, wherein the first modulation scheme comprises Gaussian Minimum Shift Keying (GMSK) modulation and the second modulation scheme comprises 8-Phase Shift Keying (8-PSK) modulation.

4. The method of claim 2, wherein estimating the first SNR comprises estimating the first SNR over the training sequence portion of the current burst.

5. The method of claim 1, further comprising:
    storing each burst previous to the current burst in the plurality of bursts in a memory; and
    demodulating each burst previous to the current burst based on the detected modulation scheme when there is a high probability that the detected modulation scheme is correct.

6. The method of claim 1, further comprising:
    detecting a modulation scheme for each burst previous to the current burst in the plurality of bursts;
    storing each burst previous to the current burst and the respective detected modulation scheme in a memory;
    comparing the stored detected modulation scheme for each burst previous to the current burst to the detected modulation scheme for the current burst when there is a high probability that the detected modulation scheme for the current burst is correct; and
    demodulating one of the bursts previous to the current burst based on the detected modulation scheme for the current burst when the stored detected modulation scheme for the one of the bursts previous to the current burst is different from the detected modulation scheme for the current burst.

7. The method of claim 1, wherein demodulating each burst subsequent to the current burst in the plurality of bursts comprises sending one or more instructions to a demodulator to demodulate each burst subsequent to the current burst based on the detected modulation scheme.

8. An apparatus for demodulating a block, the block including a plurality of bursts, comprising:
    a demodulator configured to demodulate the plurality of bursts, wherein a burst comprises a data symbol portion and a training sequence portion;
    a modulation detector configured to:
        detect a modulation scheme for a current burst in the plurality of bursts;
        determine whether there is a high probability that the detected modulation scheme is correct; and
        instruct the demodulator to demodulate each burst subsequent to the current burst in the plurality of bursts based on the detected modulation scheme when the modulation detector determines a high probability that the detected modulation scheme is correct;
    a burst signal-to-noise ratio (SNR) estimator configured to:
        receive a demodulation of the current burst based on the detected modulation scheme from the demodulator;
        estimate data symbols for the current burst based on the demodulation of the current burst;
        compute first reconstructed samples by convolving the data symbol estimates with channel estimates;
        compute second reconstructed samples by convolving the training sequence portion with the channel estimates;
        estimate a noise power by subtracting the first reconstructed samples from the data symbol portion of the current burst and subtracting the second reconstructed samples from the training sequence portion of the received demodulated current burst; and
        estimating the burst SNR based on the noise power estimate; and
    a processing unit configured to:
        compare the burst SNR estimate to a threshold; and
        determine a high probability that the detected modulation scheme is correct when the burst SNR estimate is above the threshold.

9. The apparatus of claim 8, wherein the modulation detector comprises:
    a first estimator configured to estimate a first SNR for a first modulation scheme;

a second estimator configured to estimate a second SNR for a second modulation scheme; and a processing unit configured to select one of the first and second modulation schemes based on the first and second SNR estimates.

10. The apparatus of claim 9, wherein the first modulation scheme comprises Gaussian Minimum Shift Keying (GMSK) modulation and the second modulation scheme comprises 8-Phase Shift Keying (8-PSK) modulation.

11. The apparatus of claim 9, wherein the first estimator is configured to estimate the first SNR over the training sequence portion of the current burst.

12. The apparatus of claim 8, further comprising a memory configured to store each burst previous to the current burst in the plurality of bursts, and wherein if there is a high probability that the detected modulation scheme is correct, the modulation detector is configured to instruct the memory to read out the burst previous to the current burst to the demodulator and to instruct the demodulator to demodulate each burst previous to the current burst based on the detected modulation scheme.

13. An apparatus for demodulating a block at a receiver, the block including a plurality of bursts, comprising:
means for detecting a modulation scheme for a current burst in the plurality of bursts, wherein a burst comprises a data symbol portion and a training sequence portion;
means for demodulating the plurality of bursts; and
means for determining whether there is a high probability that the detected modulation scheme is correct, wherein:
the means for demodulating is configured to demodulate each burst subsequent to the current burst in the plurality of bursts based on the detected modulation scheme when the means for determining determines a high probability that the detected modulation scheme is correct, and
the means for determining whether there is a high probability that the detected modulation scheme is correct comprises:
means for receiving a demodulated current burst based on the detected modulation scheme from the means for demodulating;
means for estimating a burst signal-to-noise ratio (SNR), wherein the means for estimating the burst SNR comprises:
means for estimating data symbols of the demodulated current burst;
means for computing first reconstructed samples by convolving the data symbol estimates with channel estimates,
means for computing second reconstructed samples by convolving the training sequence portion with the channel estimates;
the current burst, and the training sequence portion of the demodulated current burst;
means for estimating a noise power by subtracting the first reconstructed samples from the data symbol portion of the current burst and subtracting the second reconstructed samples from the training sequence portion of the demodulated current burst; and
means for estimating the burst SNR based on the noise power estimate;
means for comparing the burst SNR estimate to a threshold; and
means for determining a high probability that the detected modulation scheme is correct if the burst SNR estimate is above the threshold.

14. The apparatus of claim 13, wherein the means for detecting the modulation scheme for the current burst comprises:
means for estimating a first SNR for a first modulation scheme;
means for estimating a second SNR for a second modulation scheme; and
means for selecting one of the first and second modulation schemes based on the first and second SNR estimates.

15. The apparatus of claim 14, wherein the first modulation scheme comprises Gaussian Minimum Shift Keying (GMSK) modulation and the second modulation scheme comprises 8-Phase Shift Keying (8-PSK) modulation.

16. The apparatus of claim 14, wherein the means for estimating the first SNR estimates the first SNR over the training sequence portion of the current burst.

17. The apparatus of claim 13, further comprising:
means for storing each burst previous to the current burst in the plurality of bursts in a memory, wherein
the means for demodulating is configured to demodulate each burst previous to the current burst based on the detected modulation scheme when there is a high probability that the detected modulation scheme is correct.

18. The apparatus of claim 13, further comprising:
means for detecting a modulation scheme for each burst previous to the current burst in the plurality of bursts;
means for storing each burst previous to the current burst and the respective detected modulation scheme in a memory; and
means for comparing the stored detected modulation scheme for each burst previous to the current burst to the detected modulation scheme for the current burst when there is a high probability that the detected modulation scheme for the current burst is correct, wherein
the means for demodulating is configured to demodulate one of the bursts previous to the current burst based on the detected modulation scheme for the current burst when the stored detected modulation scheme for the one of the bursts previous to the current burst is different from the detected modulation scheme for the current burst.

19. The apparatus of claim 13, wherein the means for detecting the modulation scheme sends one or more instructions to the means for demodulating to demodulate each burst subsequent to the current burst based on the detected modulation scheme.

20. A non-transitory machine-readable medium having instructions stored thereon, the instructions being executable by one or more processors and the instructions comprising code for:
detecting a modulation scheme for a current burst in the plurality of bursts of a block, wherein a burst comprises a data symbol portion and a training sequence portion;
determining whether there is a high probability that the detected modulation scheme is correct; and
demodulating each burst subsequent to the current burst in the plurality of bursts based on the detected modulation scheme when there is a high probability that the detected modulation scheme is correct, wherein
determining whether there is a high probability that the detected modulation scheme is correct comprises:
demodulating the current burst based on the detected modulation scheme, estimating a burst signal-to-noise ratio (SNR);
comparing the burst SNR estimate to a threshold; and
determining a high probability that the detected modulation scheme is correct if the burst SNR estimate is above the threshold, wherein the code for estimating the burst SNR comprises code for:

estimating data symbols of the current burst based on the demodulated current burst;

computing first reconstructed samples by convolving the data symbol estimates with channel estimates;

computing second reconstructed samples by convolving the training sequence portion with the channel estimates;

estimating a noise power by subtracting the first reconstructed samples from the data symbol portion of the current burst and subtracting the second reconstructed samples from the training sequence portion of the demodulated current burst; and estimating the burst SNR based on the noise power estimate.

21. The machine-readable medium of claim 20, wherein the code for detecting the modulation scheme for the current burst comprises code for:

estimating a first SNR for a first modulation scheme;
estimating a second SNR for a second modulation scheme; and
selecting one of the first and second modulation schemes based on the first and second SNR estimates.

22. The machine-readable medium of claim 21, wherein the first modulation scheme comprises Gaussian Minimum Shift Keying (GMSK) modulation and the second modulation scheme comprises 8-Phase Shift Keying (8-PSK) modulation.

23. The machine-readable medium of claim 21, wherein the code for estimating the first SNR comprises code for estimating the first SNR over the training sequence portion of the current burst.

24. The machine-readable medium of claim 20, further comprising code for:

storing each burst previous to the current burst in the plurality of bursts in a memory; and
demodulating each burst previous to the current burst based on the detected modulation scheme when there is a high probability that the detected modulation scheme is correct.

25. The machine-readable medium of claim 20, further comprising code for:

detecting a modulation scheme for each burst previous to the current burst in the plurality of bursts;
storing each burst previous to the current burst and the respective detected modulation scheme in a memory;
comparing the stored detected modulation scheme for each burst previous to the current burst to the detected modulation scheme for the current burst when there is a high probability that the detected modulation scheme for the current burst is correct; and
demodulating one of the bursts previous to the current burst based on the detected modulation scheme for the current burst when the stored detected modulation scheme for the one of the bursts previous to the current burst is different from the detected modulation scheme for the current burst.

26. The machine-readable medium of claim 20, wherein the code for demodulating each burst subsequent to the current burst in the plurality of bursts comprises code for sending one or more instructions to a demodulator to demodulate each burst subsequent to the current burst based on the detected modulation scheme.

27. An apparatus for demodulating a block, the block including a plurality of bursts, comprising:

at least one processor configured to:

detect a modulation scheme for a current burst in the plurality of bursts, wherein a burst comprises a data symbol portion and a training sequence portion, instruct a demodulator to demodulate the current burst based on the detected modulation scheme, estimate data symbols of the current burst based on the demodulated current burst;

compute first reconstructed samples by convolving the data symbol estimates with channel estimates;

compute second reconstructed samples by convolving the training sequence portion with the channel estimates;

estimate a noise power by subtracting the first reconstructed samples from the data symbol portion of the current burst and subtracting the second reconstructed samples from the training sequence portion of the demodulated current burst;

estimate a burst signal-to-noise ratio (SNR) based on the noise power estimate;

compare the burst SNR estimate to a threshold;

determine whether there is a high probability that the detected modulation scheme is correct if the burst SNR estimate is above the threshold, and instruct the demodulator to demodulate each burst subsequent to the current burst in the plurality of bursts based on the detected modulation scheme when the at least one processor determines a high probability that the detected modulation scheme is correct.

28. The apparatus of claim 27, wherein the at least one processor is configured to estimate a first SNR for a first modulation scheme, to estimate a second SNR for a second modulation scheme, and to select one of the first and second modulation schemes based on the first and second SNR estimates.

29. The apparatus of claim 28, wherein the first modulation scheme comprises Gaussian Minimum Shift Keying (GMSK) modulation and the second modulation scheme comprises 8-Phase Shift Keying (8-PSK) modulation.

30. The apparatus of claim 28, wherein the at least one processor is configured to estimate the first SNR over the training sequence portion of the current burst.

31. The apparatus of claim 27, wherein the at least one processor is configured to instruct a memory to read out a burst previous to the current burst and to instruct the demodulator to demodulate the burst previous to the current burst based on the detected modulation scheme when there is a high probability that the detected modulation scheme is correct.

\* \* \* \* \*